United States Patent [19]

Chapman

[11] Patent Number: 4,890,852

[45] Date of Patent: Jan. 2, 1990

[54] TOW MECHANISM FOR VEHICLES

[76] Inventor: Gerald C. Chapman, Rte. 2, Box 153, Somerville, Ala. 35670

[21] Appl. No.: 313,415

[22] Filed: Feb. 22, 1989

[51] Int. Cl.$^4$ ................................................ B60P 3/06
[52] U.S. Cl. .................................... 280/402; 414/563
[58] Field of Search ...................... 280/402, 476.1, 480; 414/563

[56] References Cited

U.S. PATENT DOCUMENTS

| 2,988,382 | 6/1961 | Holland | 280/402 |
| 3,127,193 | 3/1964 | Johnson et al. | 280/402 |
| 3,831,980 | 8/1974 | Kniff | 280/402 |
| 4,763,914 | 8/1988 | Lemmons | 280/402 |

Primary Examiner—Charles A. Marmor
Assistant Examiner—Donn McGiehan
Attorney, Agent, or Firm—Diller, Ramik & Wight

[57] ABSTRACT

A tow mechanism for vehicles including a frame having front and rear ends, a platform at the front end for supporting the front wheels of a towed vehicle, a pair of cables at the rear end of the frame adapted to be secured to the towed vehicle rear end, and a winch associated with the cables which elevates the rear end of the frame in spaced relationship to the ground and the towed vehicle rear wheels establish rolling support for the tow mechanism during a towing operation.

19 Claims, 2 Drawing Sheets

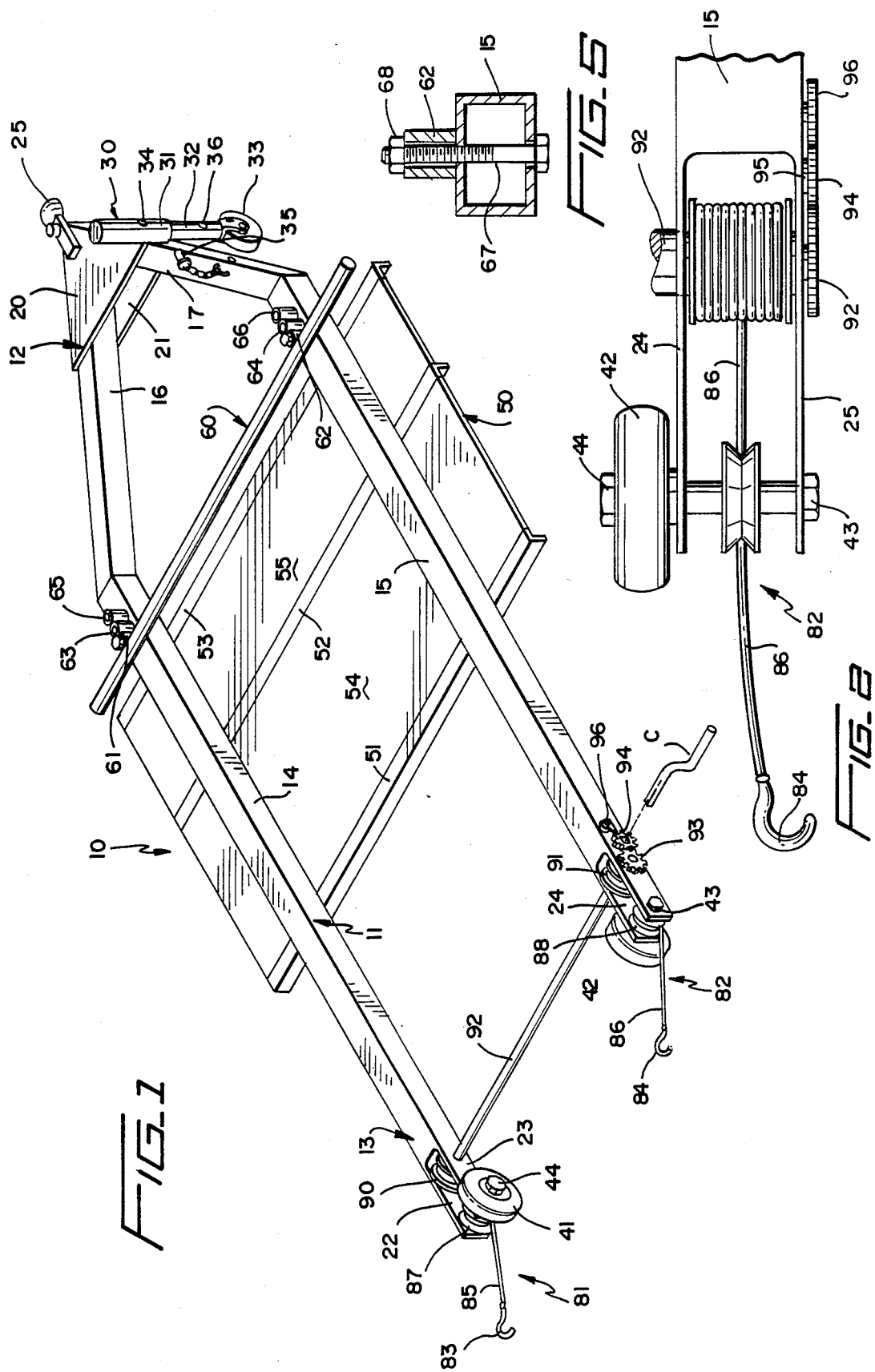

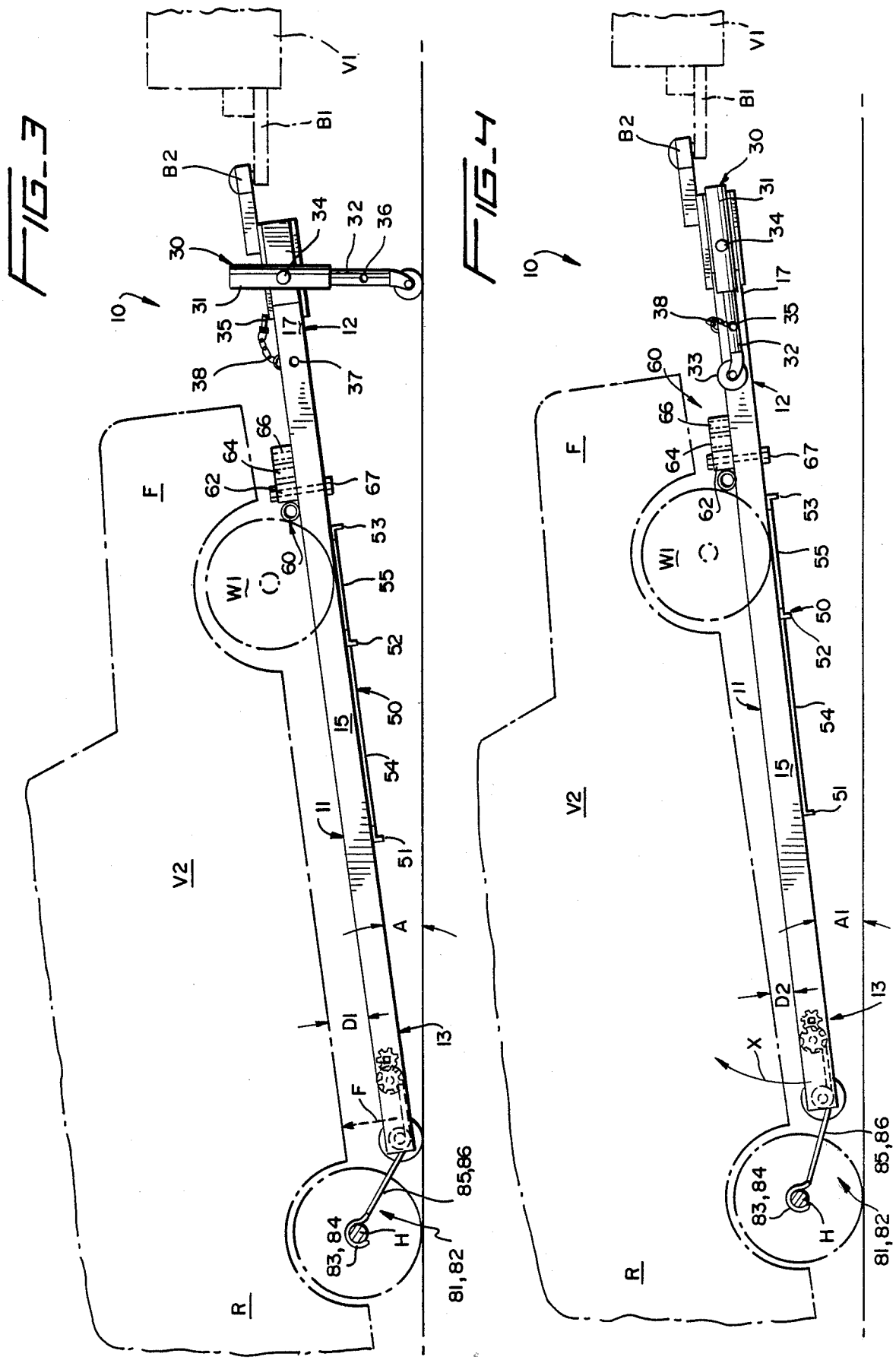

TOW MECHANISM FOR VEHICLES

BACKGROUND OF THE INVENTION

The present invention relates to a tow mechanism for attachment to a vehicle, such as an automobile, bus or moble home (towing vehicle) from which another vehicle (towed vehicle), most commonly another automobile, can be towed. It is relatively common to see a mobile home towing a relatively small "economy" car, and one primary purpose for this often seen vehicle combination is the comfort and accommodations provided by the mobile home and the fuel economy and convenience provided by the smaller automobile. Most commonly, the mobile home is parked for several days, a week or more at a particular location, and the automobile is used for so-called "day" trips, as is most common when the mobile home/economy car are used by vacationers.

DESCRIPTION OF THE PRIOR ART

Heretofore conventional automobile tow bars have been provided by means of which one vehicle can be towed by another vehicle with a relative degree of safety during towing. The problems associated with conventional tow bars are generally not during the towing operation but the problems associated with connecting the tow bars to and removing the tow bars from the towed/towing vehicles. In two conventional tow bars disclosed in U.S. Pat. Nos. 3,758,135 and 3,831,980, both in the name of August A. Kniff, the vehicle which is to be towed must first be fitted with a bracket and one must accurately align the tow bar with the bracket generally while lying prone upon ground and in most cases while being at least partially beneath the vehicle to-be-towed, obviously respectively difficult and dangerous prospects. In U.S. Pat. No. 4,186,938 issued to John W. Youngblood, another vehicle tow bar is disclosed which is highly complex and requires extraordinary manipulation for both assembly and disassembly relative to the towed and towing vehicles. A further example of an extremely complicated tow bar is found in U.S. Pat. No. 4,434,993 in the name of Stanley F. Curtis which is again exemplary of another very complicated tow bar which is extremely difficult to connect and disconnect between the associated vehicles. A simple tow bar is found in U.S. Pat. No. 4,592,564 in the name of Rudolph M. Warnock et al., but even this tow bar requires special mounting brackets and is associated with ATV/ATC vehicles which are, obviously, lightweight as compared to conventional automobiles, and can be manually lifted, pushed and pulled which simply can not be done with heavier conventional automobiles, economy size or standard. Accordingly, virtually all known towing devices or tow bars are extremely complex, are relatively difficult to connect and disconnect from either or both of the associated vehicles, and in most cases require some type of adaptive measures to be utilized with either or both of the vehicles.

SUMMARY OF THE INVENTION

The present invention overcomes the disadvantages heretofore noted in the towing devices/tow bars of the aforementioned patents, particularly by providing a tow mechanism which is extremely simple in construction and, therefore, can be manufactured and sold at relatively moderate prices, has few moving parts, can be connected to the towing vehicle by a conventional ball and socket connection, and most importantly can be quickly, easily, efficiently, reliably and safely connected to the towed vehicle. The frame of the towed mechanism has at a forward end portion thereof a support which is normally inclined and upon which the front wheels of the towed vehicle can be driven. A step-wise adjustable abutment is provided so that the front wheels of the vehicle are accurately located on the tow mechanism simply by "feel," namely, once the front wheels "bump the abutment, this indicates the front wheels are accurately located upon the support. Thereafter, a cable at each side of the tow mechanism frame at its rearward frame portion is hooked to the towed vehicle undercarriage and the cables are then wound upon winches through the use of a conventional crank. As the cables are wound upon the winches, the rearward frame portion rises from the ground and when sufficient clearance between the rearward frame portion and the ground has been achieved, the winches are locked and towing can proceed in the customary fashion. In order to remove the towed vehicle from the tow mechanism, the cables are payed out resulting in the progressive lowering of the frame rearward portions until the latter contact the ground after which the cables can be disconnected from the undercarriage of the towed vehicle and the latter can simply be backed off and removed from the tow mechanism. From the foregoing, it should be observed that the tow mechanism of this invention can be connected to and disconnected from the towing vehicle by a conventional ball and socket tow bar fitting which is straightforward, efficient, quick and safe. The towed vehicle requires no modification whatever and need but be driven upon the front wheel support of the tow mechanism frame, and the accuracy of its position thereon is established automatically by contact of the front wheels with the abutment. The latter procedure involves only the ability of an average driver to drive the front wheels of a vehicle upon a relatively large platform. Finally, the flexible cables can be quickly and safely hooked to the vehicle undercarriage, be it any part of the rear frame, rear end, or rear suspension system, and this can be done simply by reaching under the vehicle quickly and safely without exposing one's self to harm as might necessarily be required by crawling under vehicles to connect other conventional tow bars. All that is then required is to winch the cables through an appropriate crank which raises the rearward frame portion above the ground and permits towing to proceed conventionally thereafter.

Obviously, the ease of connecting the towed and towing vehicles, as just described, is equally applicable to disconnecting these vehicles.

With the above, and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a top perspective vie of a novel tow mechanism for vehicles of this invention, and illustrates a frame, a support traversing a forward frame portion, and a pair of cables and winches for connecting the tow mechanism to the rear end undercarriage of a towed vehicle.

FIG. 2 is a fragmentary enlarged top plan view, and illustrates a rearward end of one of a pair of boxed beams defining the tow mechanism frame, and illustrates a winch, pulley and wheel carried thereby.

FIG. 3 is a diagrammatic side elevational view of the tow mechanism, and illustrates a towed vehicle positioned thereon incident to elevating the rearward end portion of the frame to its in-use/towing position.

FIG. 4 is a schematic side elevational view of the tow mechanism, and illustrates the in-use or towed position in which the rearward end of the frame has been elevated.

FIG. 5, which appears on the sheet of drawings containing FIGS. 1 and 2, is an enlarged cross-sectional view taken generally along line 5-5 of FIG. 3, and illustrates a pin and one of a plurality of tubes for step-adjusting an abutment bar which transverses a forward portion of the frame.

DESCRIPTION OF THE PREFERRED EMBODIMENT

A novel tow mechanism for vehicles is best illustrated in FIG. 1 of the drawings, and is generally designated by the reference numeral 10.

The tow mechanism 10 is designed to be conventionally connected to a towing vehicle V1 (FIGS. 3 and 4) and to a towed vehicle V2. The towing vehicle V1 can be, for example, an automobile, a mobile home, a bus, truck or the like, while the towed vehicle V2 can be any one of the latter vehicles but is most commonly a standard size or economy size vehicle.

The tow mechanism 10 includes a frame 11 having a forward frame portion 12 and a rearward frame portion 13. The frame portion 13 is formed from a pair of box beams 14, 15 which are in generally parallel relationship to each other and a pair of box beams 16, 17 which diverge in a direction toward the box beams 14, 15. The cross-section of the box beams 14 through 17 is illustrated in FIG. 5. The box beams 16, 17 are sandwiched between a pair of plates 20, 21 and are welded thereto and to each other. The box beams 16, 17 are also welded to the box beams 14, 15, respectively. At the rearward frame portion 13 each of the box beams 14, 15 is slotted through the upper and lower walls (unnumbered) leaving a pair of opposite, generally parallel vertical walls 22, 23 and 24, 25 (FIG. 1) associated with the box beams 11, 15, respectively.

The forward end portion 12 of the frame 11 carries a conventional tow bar fitting 25 which defines means for securing the frame 11 to the towing vehicle V1 (FIGS. 3 and 4) through the conventional tow bracket B1 and ball B2 carried thereby.

Means generally designated by the reference numeral 30 is provided for maintaining the forward frame portion 12 of the frame 11 elevated above the rearward frame portion 13 (FIG. 3) when the towed vehicle V2 is secured in the operative position relative to the tow mechanism 10. The means 30 is a support leg defined by an upper tube 31 which receives therein a lower tube 32, and the lower tube 32 carries a conventional caster wheel 33 which pivots about a vertical axis in a conventional manner. The tubes 31, 32 are welded together and the tube 31 is connected by a pivot pin 34 to the box beam 17 of the forward frame portion 12. The pivot pin 34 permits the support 30 to be pivoted between the positions shown in FIGS. 3 and 4. In the inuse/towing or travel position shown in FIG. 4 the support 30 is locked in a conventional fashion to the box beam 17 as, for example, by inserting a pin 35 into aligned holes 36, 37 (FIG. 3) of the tube 32 and box beam 17, respectively. A short chain 38 having one of its links welded to the box beam 17 assures that the pin 35 will not be lost when not in use. The primary function of the support 30 is to allow the tow mechanism 10 to be manually rolled along a supporting surface or the ground G when the vehicle V2 has not yet been positioned thereupon when, for example, the tow mechanism 10 is being moved from its stored position to be connected to the ball B2 of the vehicle V1. Obviously, the support 30 is also in its down position when the tow mechanism 10 is being moved to its stored position after being disconnected from the ball B2 of the vehicle V1. Obviously, the support 30 is also in its down position when the tow mechanism 10, again without the vehicle V2 being associated therewith, is being manually moved along the ground G at any time.

In order to further assist ease of manual movement of the tow mechanism 10, the rearward frame portion 30 includes a pair of wheels 41, 42 which are carried by the respective box beams 14, 15 on the inboard sides thereof immediately adjacent the respective walls 23, 24. Bolts 43 (FIGS. 1 and 2) pass through openings (not shown) of the walls 22 through 25 and carry appropriate spacers, washers, lock nuts, and nuts 44 to retain the wheels 41, 42 in general axial alignment with each other. While the tow mechanism 10 is relatively lightweight, the wheels 41, 42 and the caster wheel 33, when the support 30 is in its vertical position, allows the tow mechanism 10 to be easily rolled along the ground G for the purposes heretofore described.

Means 50 are also provided for underlyingly supporting the front end F of the towed vehicle V2 through the front wheels W1 thereof. Means 50 includes three rigid angle bars 51 through 53 which are in generally spaced parallel relationship to each other and which underlie and are welded to the box beams 14, 15. A support plate 54 lies between the angle bars 51, 52 and another support plate 55 lies between the angle bars 52, 53. The support plates 54, 55 are welded to the respective angle bars 51, 52; 52, 53 and to the box beams 14, 15. Thus, the means 50 establishes a generally rigid and flat platform upon which the vehicle V2 can be driven when the tow mechanism 10 is in the position shown in FIG. 3, as will be described more fully hereinafter. However, it will be noted that when the support 30 is in its vertical position (FIG. 3), a plane taken through the vehicle front end support means or supporting platform 50 defines an acute angle A (FIG. 3) with a generally horizontal plane through the supporting surface or ground G. This acute angle A is relatively shallow to permit the vehicle V2 to be driven from left-to-right in FIG. 3 toward, up, upon and forwardly of the supporting platform 50 to the eventual towing or in-use position shown in FIG. 4.

The forward frame portion 12 also carries front wheel abutment means generally designated by the reference numeral 60 which function to be contacted by the towed vehicle wheels W1 when the vehicle V2 is being driven forwardly upon the supporting platform 50. The abutment means 60 is a tubular bar which is welded at generally opposite ends thereof to a tubular sleeve 61, 62. The tubular sleeves 61, 62 are in turn welded to tubular sleeves 63, 64 which are in turn welded to tubular sleeves 65, 66. The axes of the sleeves 61, 63, 64 and 62, 64, 66 are generally parallel to each other and normal to the axis of the abutment bar or abutment tube 60. A headed bolt 67 (FIG. 5) passes through openings (unnumbered) in the upper and lower walls of each of the box beams 14, 15, and the upper end of each of the bolts 67 can be selectively positioned in selected pairs 61, 62; 63, 64 and 65, 66 of the sleeves 61 through 66, after which a nut 68 can be tightened thereon. In the position shown in FIG. 1, each bolt 67 passes through the associated sleeve 61, 62 and this position accommodates a vehicle V2 thereon, as shown in FIG. 3 with the wheels W1 thereof in abutment with the abutment bar 60. Depending upon the size of the towed vehicle V2 and/or the size of the wheels W1, it may be desirable to adjust the position of the wheels W1 upon the supporting platform 50. In order to achieve such step-wise adjustment the nuts 68 are removed, the abutment tube 60 is lifted upwardly from the position shown carrying therewith the sleeves 61 through 66 and thereafter any of the two remaining selected pairs 63, 64 and 65, 66 of the sleeves 63 through 66 can be utilized to move the abutment bar 60 to the left from the position shown in FIG. 1. In this fashion three different positions of the abutment bar 60 relative to the platform 50 can be achieved to accommodate vehicles V2 of varying sizes, lengths, wheel bases and wheel sizes. Furthermore, as the vehicle V2 is driven forward (FIG. 3) during loading, the abutment bar 60 is eventually contacted or bumped by the wheels W1 and this can be felt by the driver of the vehicle V2 to indicate that the vehicle is properly positioned upon the tow mechanism 10, after which the operator of the vehicle V2 simply cuts the ignition, sets his emergency brake and proceeds with the subsequent task of quickly securing the rear end R of the vehicle V2 to the tow mechanism 10, as will be described immediately hereinafter.

Reference is made to FIG. 3 of the drawing which, as heretofore noted, illustrates the vehicle V2 after the same has been driven upon the supporting platform 50 with the position thereof being established upon the driver feeling the contact of the wheels W1 with the abutment bar 60. In the position shown in FIG. 3, the wheels 41, 42 rest upon the ground G, as does the caster wheel 33. However, at this time the leg 30 can be pivoted to the position shown in FIG. 4 and locked thereat by the pin 35 in the manner heretofore described. Particular note should be made at this time of the angle A heretofore noted and the fact that when the vehicle V2 is positioned initially upon the tow mechanism 10, a predetermined distance D1 (FIG. 3) is established between an upper surface (unnumbered) of the frame 11 and a plane through the lower surface (unnumbered) of the vehicle V2.

Means 81, 82 (FIG. 1) are carried by the respective box beams 14, 15 for both clamping or securing the rear end R of the vehicle V2 to the rearward frame portion 13 of the tow mechanism 10 and tightly clamping/connecting the same thereto by tension or pulling forces effected by a manually operable crank C (FIG. 1). The means 81, 82 each include a hook 83, 84 connected to an elongated element, member or flexible cable 85, 86 which is partially entrained about a respective pulley 87, 88 carried by the bolts 43 (FIG. 2). The cables 85, 86 are in turn connected to winches or drums 90, 91 which are fixed to a shaft 92 journaled at the ends thereof in a conventional manner in the box beams 14, 15. A gear 93 is welded to the shaft 92 adjacent the wall 25 (FIG. 2) and meshes with another gear 94 connected to a stub shaft 95 (FIG. 2) which is conventionally mounted for rotation in the wall 25. The stub shaft 95 has a square opening (unnumbered) which mates with the square end (unnumbered) of the crank C. A ratchet dog or locking dog 96 is conventionally pivoted to the wall 25 and meshes with the gear 94 in a conventional fashion to prevent the gear 94 from rotating unless the latching dog 96 is manually removed from engagement therewith in a conventional fashion.

Turning to FIG. 3 of the drawings, the rear end R of the vehicle V2 includes conventional springs S, shock absorbers SA, a differential housing H, rear swing arms AS and an undercarriage or frame FR. Once the vehicle V2 has been driven to the position shown, each of the hooks 83, 84 is manually connected preferably to the undercarriage or frame FR of the vehicle rear end R, as is schematically illustrated in FIG. 3. However, the hooks 83, 84 can, as well, be connected to conventional rear end structure, as, for example, the rear end suspension system, brackets associated with the drive shaft or differential housings, conventional cargo tie-down lugs/holes, etc. Furthermore, rather than the hooks 83, 84 being directly hooked over a part of the vehicle rear frame FR, as shown in FIG. 3, the flexibility of the cables 85, 86 allow the same to be looped over any particular part of the rear end R and then the hooks 83, 84 are merely hooked upon their associated cable 85, 86 in a well known and conventional manner. Once the hooks 83, 84 and associated cables 85, 86 are connected to the rear end R of the vehicle V2, as shown in FIG. 3, the crank C is inserted into the square socket (unnumbered) of the gear 94 and is rotated clockwise which in turn rotates the gear 93 counterclockwise along with the drums or winches 90, 91 fixed to the shaft 92. As the winches 90, 91 rotate counterclockwise, the cables 95, 96 are wound thereupon and eventually a vertical force vector F (FIG. 3) thereof begins lifting the rearward end portion 13 of the tow mechanism 10 upwardly and in effect begins pivoting the entire tow mechanism clockwise about the ball B2, as indicated by the arrow X in FIG. 4 associated with the frame 11. Since the brake of the vehicle V2 has been set and the front wheels W1 are in contact with the abutment bar 60, the vehicle V2 can no be moved forwardly from the position shown in FIG. 3 as the winches 90, 91 are continuously rotated clockwise and, thus, the vector force F progressively raises the rearward end portion of the frame 13 until the wheels 41, 42 are spaced the distance S (FIG. 4) from the ground G. When sufficient space or clearance S has been achieved, the crank C and be withdrawn and, of course, unwinding is precluded because the locking dog 96 prevents rotation of the gear 94, thus locking the gear 93 in a position at which the space S will be maintained during towing. During the same upward motion of the rear frame portion 13 between the position shown in FIG. 3 to that shown in FIG. 4, it will be observed that the predetermined distance D1 (FIG. 3) lessens to the distance D2 (FIG. 4) which, of course, creates the space S and, correspondingly, the angle A of FIG. 3 lessens to an angle A1 (FIG. 4). Once positioned, as shown in FIG. 4, the brake of the vehicle V2 need simply be released and towing can commence.

From the foregoing it is readily apparent that the tow mechanism 10 is of a relatively straightforward construction formed of a minimum of readily accessible off-the-shelf parts which can be quickly and economically assembled together to create a lightweight, durable, efficient and extremely safe towing mechanism 30, particularly from the standpoint of ease of uniting the towed vehicle V2 to the tow mechanism 10 and removing the same therefrom. As noted earlier, the vehicle V2 is simply driven atop the supporting platform 50 in the absence of any type of precise alignment, and this can be performed by the average driver with little, if any, trouble whatsoever. Furthermore, one need not crawl beneath the vehicle V2 or the towing mechanism 10 when connecting the means 81, 82 thereto, it being simply necessary to reach one's arm from the outside of the vehicle V2 beneath the same and do so momentarily to effect desired connection or disconnection. Obviously, the vehicle V2 need not be modified in any fashion whatsoever. Accordingly, the disadvantages of known tow bars heretofore earlier noted, as well as others which have not been specified herein, are totally eliminated by the novel and unobvious tow mechanism 10 of the present invention.

The tow mechanism 10 may, of course, be modified within the spirit and scope of this invention. For example, the shaft 92 need not extend and have connected thereto the winches or drums 90, 91. Instead, a short stub shaft can be associated with each of the drums 90, 91 and the wall 92 can have connected thereto a locking dog and gear 94 corresponding too the locking dog 96 and gear 94 associated with the drum 91. Likewise, a gear corresponding to the gear 93 can be connected to the shorter stub shaft 92 of the drum 90. In order to pull the rearward frame portion 13 upwardly toward the underside of the vehicle rear end R, one need now use the crank C alternatively at opposite sides of the fram 11 cranking one and then the other of the gears 93 to progressively lift the rearward frame portion 13. This will cant or cock the frame 11, but no harm is created thereby. As a matter of fact, one side can be totally elevated, followed by total elevation of the opposite side because of the overall flexibility, yet high strength, of the design of the tow mechanism 10.

In lieu of the pivoting of the leg 30, the tube 32 can be constructed to telescope up and down in the tube 31 by an appropriate rack and pinion arrangement, as is conventionally known. In this case, the tube 30 can be welded to the box beam 17 in its vertical position and there is, therefore, no need for the pivot 34, the holes 36, 37, the pin 35 or the chain 38.

Although a preferred embodiment of the invention has been specifically illustrated and described herein, it is to be understood that minor variations may be made in the apparatus without departing from the spirit and scope of the invention, as defined in the appended claims.

What is claimed is:

1. A tow mechanism for vehicles comprising a frame having forward and rearward opposite frame portions, means at said forward frame portion for securing said frame to a towing vehicle, means at said forward frame portion for underlyingly supporting the front end of a towed vehicle through the front wheels thereof, means at said rearward frame portion for connecting said rearward frame portion to a rear end of a towed vehicle when the front wheels of the towed vehicle rest upon said supporting means and said rearward frame portion is spaced a predetermined distance from the towed vehicle rear end, and means for pulling said rearward frame portion toward the towed vehicle rear end thereby pivoting said frame about said securing means and lessening said predetermined distance whereby said rearward frame portion is elevated in spaced relationship to a supporting surface and said towed vehicle rear wheels establish rolling support for the frame during a towing operation.

2. The tow mechanism as defined in claim 1 wherein said forward frame portion includes means for maintaining said forward frame portion elevated above said rearward frame portion thereby establishing an acute angle with the supporting surface which lessens as said predetermined distance lessens.

3. The tow mechanism as defined in claim 1 wherein said pulling means includes an elongated member of a predetermined effective length at said predetermined distance, and means for reducing said predetermined effective length to create said lessened predetermined distance.

4. The tow mechanism as defined in claim 1 wherein said rearward frame portion normally rests upon said supporting surface incident to driving the front wheels of the towed vehicle upon said supporting means, and said forward frame portion includes means for maintaining said forward frame portion elevated above said rearward frame portion incident to driving the front wheels of the towed vehicle upon said supporting means thereby establishing an acute angle between the supporting means and the supporting surface which lessens as said predetermined distance lessens.

5. The tow mechanism as defined in claim 1 including means at said forward frame portion for preventing front wheels of the towed vehicle from moving forwardly beyond a generally predetermined position relative to said supporting means.

6. The tow mechanism as defined in claim 1 including means at said forward frame portion for preventing front wheels of the towed vehicle from moving forwardly beyond a generally predetermined position relative to said supporting means, and means for selectively adjusting the position of said forward movement preventing means to selectively vary the distance of the predetermined position between said forward and rearward frame portions to accommodate vehicles of different wheel sizes.

7. The tow mechanism as defined in claim 1 including means at said forward frame portion for preventing front wheels of the towed vehicle from moving forwardly beyond a generally predetermined position relative to said supporting means, and means for selectively stepwise adjusting the position of said forward movement preventing means to selectively vary the distance of the predetermined position between said forward and rearward frame portions to accommodate vehicles of different wheel sizes.

8. The tow mechanism as defined in claim 1 including wheel means carried by said rearward frame portion which normally rest upon said supporting surface incident to driving the front wheels of the towed vehicle upon said supporting means and as elevated above the supporting surface when said predetermined distance is lessened.

9. The towing mechanism as defined in claim 1 wherein said connecting means included a flexible cable.

10. The towing mechanism as defined in claim 1 wherein said pulling means includes a flexible cable 11. The towing mechanism as defined in claim 1 wherein said pulling means and connecting means include a flexible cable.

12. The towing mechanism as defined in claim 3 wherein said elongated member is a flexible cable.

13. The towing mechanism as defined in claim 3 wherein said elongated member is a flexible cable and said reducing means includes a winch.

14. The tow mechanism as defined in claim 3 including means at said forward frame portion for preventing front wheels of the towed vehicle from moving forwardly beyond a generally predetermined position relative to said supporting means.

15. The tow mechanism as defined in claim 3 including means at said forward frame portion for preventing front wheels of the towed vehicle from moving forwardly beyond a generally predetermined position relative to said supporting means, and means for selectively adjusting the position of said forward movement preventing means to selectively vary the distance of the predetermined position between said forward and rearward frame portions to accommodate vehicles of different wheel sizes.

16. The tow mechanism as defined in claim 3 including wheel means carried by said rearward frame portion which normally rest upon said supporting surface incident to driving the front wheels of the towed vehicle upon said supporting means and as elevated above the supporting surface when said predetermined distance is lessened.

17. The towing mechanism as defined in claim 14 wherein said elongated member is a flexible cable.

18. The towing mechanism as defined in claim 15 wherein said elongated member is a flexible cable.

19. The towing mechanism as defined in claim 16 wherein said elongated member is a flexible cable.

* * * * *